(12) United States Patent
Liang

(10) Patent No.: US 7,208,846 B2
(45) Date of Patent: Apr. 24, 2007

(54) METHOD AND APPARATUS FOR GENERATING ELECTRICITY BY WASTE AIRFLOW OF AIR CONDITIONING EQUIPMENT

(76) Inventor: Chao-Hsiung Liang, No. 38, Sec. 1, Jiadong Rd., Changhua City, Changhua Hsien (TW)

( * ) Notice: Subject to any disclaimer, the term of this patent is extended or adjusted under 35 U.S.C. 154(b) by 9 days.

(21) Appl. No.: 11/257,022

(22) Filed: Oct. 25, 2005

(65) Prior Publication Data

US 2006/0226657 A1    Oct. 12, 2006

(30) Foreign Application Priority Data

Apr. 12, 2005  (TW) ................. 94111499 A
Apr. 12, 2005  (TW) ................. 94205679 U
Jul. 8, 2005    (TW) ................. 94211674 U

(51) Int. Cl.
  F02B 63/04   (2006.01)
  H02K 7/18    (2006.01)
  F03B 13/00   (2006.01)
  F03B 13/10   (2006.01)
  H02P 9/04    (2006.01)

(52) U.S. Cl. ................. 290/1 R; 290/43; 290/54
(58) Field of Classification Search ........... 290/1 R, 290/54, 43
  See application file for complete search history.

(56) References Cited

U.S. PATENT DOCUMENTS 3,832,853 A * 9/1974 Butler, Jr. ............. 60/641.12
4,200,783 A * 4/1980 Ehret .................... 392/341
5,014,770 A * 5/1991 Palmer ................... 165/48.2
5,074,114 A * 12/1991 Meijer et al. ............ 60/517
5,391,925 A * 2/1995 Casten et al. ........... 290/1 R
5,394,016 A * 2/1995 Hickey .................. 290/55
5,559,379 A * 9/1996 Voss ..................... 310/63
6,201,313 B1 * 3/2001 Nakamats ............... 290/54
6,225,705 B1 * 5/2001 Nakamats ............... 290/43
7,145,258 B2 * 12/2006 Kang et al. ............. 290/2

* cited by examiner

*Primary Examiner*—Julio Gonzalez
(74) *Attorney, Agent, or Firm*—Rosenberg, Klein & Lee

(57) ABSTRACT

A method and an apparatus of generating electric power by recycling waste wind energy produced by a heat dissipating ventilation machine of an air conditioning equipment comprise: a motive power end producing waste wind energy during its operation; a passive select driver installed at the motive power end for receiving the transmission of the waste wind energy, so that the passive select driver starts running and converts mechanical energy into electric energy; an electric power converter for receiving electric current sent from the passive select driver and outputting power after regulating and modulating AC and DC. The motive power end is used to produce waste wind energy which is converted into electric energy, so as to save the use of electric power and provide a better effect of providing electric power. In the meantime, the waste energy can be reused and thus complying with the requirements for environmental protection.

13 Claims, 12 Drawing Sheets

METHOD AND APPARATUS FOR GENERATING ELECTRICITY BY WASTE AIRFLOW OF AIR CONDITIONING EQUIPMENT

FIELD OF THE INVENTION

The present invention relates to an electricity generating apparatus by using waste wind energy discharged from an air conditioner.

BACKGROUND OF THE INVENTION

Referring to FIG. 11 for the system of a prior art water-cooling air conditioning system 80, the operation of more than eight hours for such system is generally required, particularly for buildings and factories that require two or more sets of central air conditioners for the alternate operations in 24 hours a day, and thus the accessory equipment of the water cooling tower is primarily used for producing heat exchanged by water and compulsory ventilation, so as to dissipate the heat produced by the operations of the condenser of the air conditioner and the load directly into the atmosphere. Such arrangement wastes energy since it does not have an effective recycle and reuse of the energy, and thus the design of integrating the discharged wind with a wind power generator is studied to recycle and reuse the waste energy.

A prior art wind power generating device 80 as shown in FIG. 12, and the structure comprises a windmill power generator 81 having a vane 82 and uses the natural wind energy to rotate the vane 82 and drive a motor 83 installed at the axle of the vane 82 to convert the wind energy into a mechanical energy. A generator 84 connected to the motor 83 converts the mechanical energy into an electric energy which is sent to a windmill controller 85 and outputted to a power storage device 86 and finally sent to an electric power controller 87 for supplying electric power. A solar energy power generator 91 as shown in FIG. 9 can be installed and connected to a solar energy controller 92 for controlling the current, so that two kinds of energies can be converted and supplied to improve the quantity of electric power.

The foregoing structure uses wind as the energy and coverts the wind energy into a mechanical energy by various technical structures, so that the mechanical energy can be inputted into a generator and converted into electric energy. However, the foregoing structure must come with a large wind converting machine, not only incurring a high cost, but also occupying a large area of space. Furthermore, the source of wind or daylight is insufficient for the power generation to be continued or the efficiency of generating electric power is very low. Therefore, the present invention provides a way of obtaining stable kinetic energy by using the wind of an air conditioning machine to drive an electricity generating windmill, so as to overcome the problems of having unstable and intermittent supply of the recycled power source or occupying too much space. The invention provides a better structure to achieve the effects of saving power and protecting our environment.

The present invention intends to provide an electricity generating structure by wind, and more particularly to a method and an apparatus that recycle and convert waste wind energy discharged from an air conditioner into energy to supply or store electric power and achieve the effects of supplying continuous electric power, lowering the use and cost of electricity, and complying with the requirements of environmental protection.

SUMMARY OF THE INVENTION

To overcome the foregoing shortcomings, a method and an apparatus of generating electric power by recycling waste energy of wind produced by a heat dissipating ventilation machine of an air conditioning equipment in accordance with the present invention comprise: a motive power end that produces waste wind energy during its operation; a passive select driver installed at a predetermined upper section of the motive power end for receiving the transmission of the waste wind energy, so that when the passive select driver starts running, the mechanical energy is converted into electric energy; an electric power converter for receiving the electric current from the passive select driver and outputting the power after the AC or DC is regulated and modulated. By the aforementioned method, the motive power end is used to produce waste wind energy which is converted into electric energy, so as to save the consumption of electric power and provide a better effect of supplying electric power. In the meantime, the waste energy can be reused and thus complying with the environmental protection requirements.

Therefore, it is a primary objective of the present invention to provide a method of generating electricity by waste wind produced from an air conditioning equipment or a ventilating machine that adopts the design of reusing waste energy to convert the wind energy discharged from an air conditioner into the electric power, and thus complying with the environmental protection requirements.

Another objective of the present invention is to provide a method of generating electricity by waste wind produced from an air conditioning equipment or a ventilating machine that optimizes the electric power supply for saving the consumption of electricity and lowering the cost.

A further objective of the present invention is to provide a method of generating electricity by waste wind produced from an air conditioning equipment or a ventilating machine that outputs steady electric power to overcome the problems of the original wind power generator having unstable and intermittent power supply.

Another further objective of the present invention is to provide a method of generating electricity by waste wind produced from an air conditioning equipment or a ventilating machine that fits various different models of heat dissipating or ventilating air conditioners, and maximizing the utility of electric power by connecting several sets of air conditioners in series.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
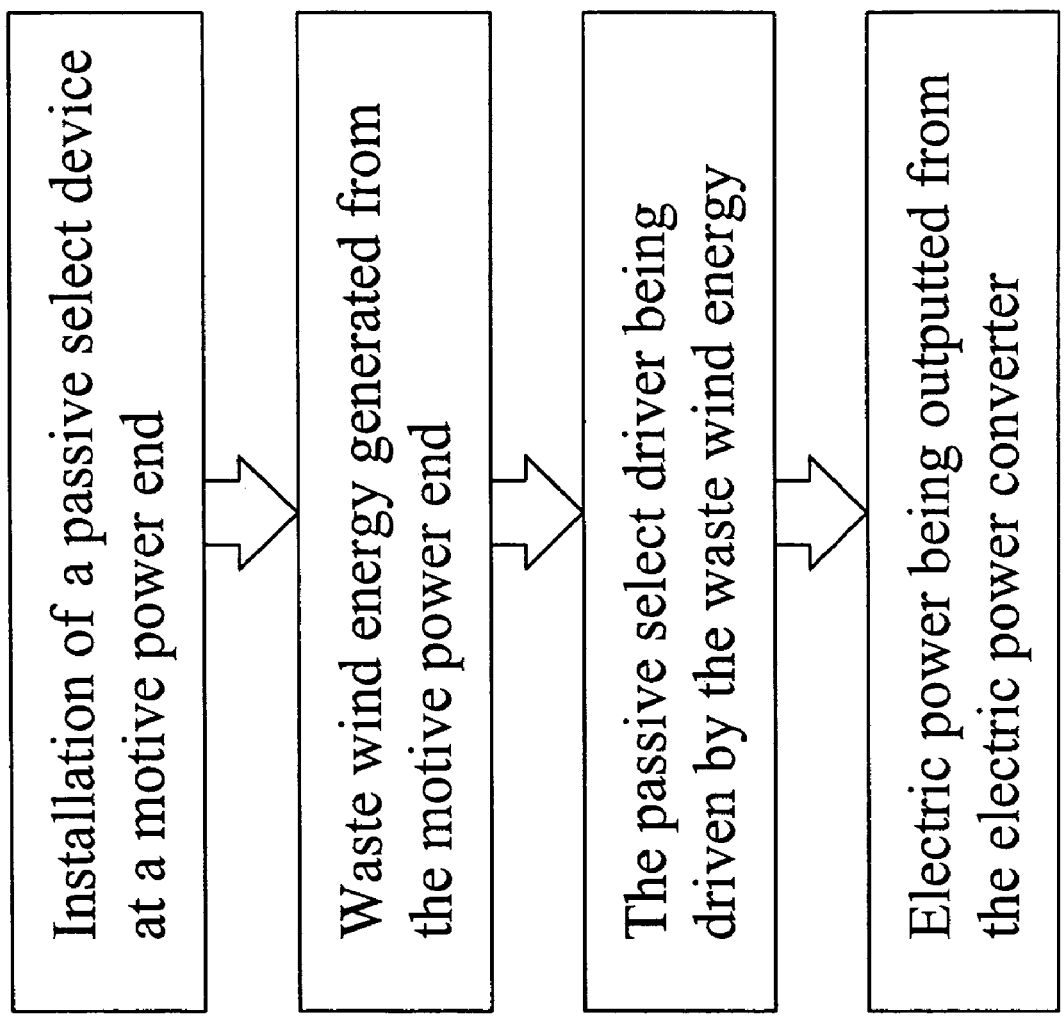
FIG. 1 is a flow chart of a first preferred embodiment of the invention.
Figure 2:
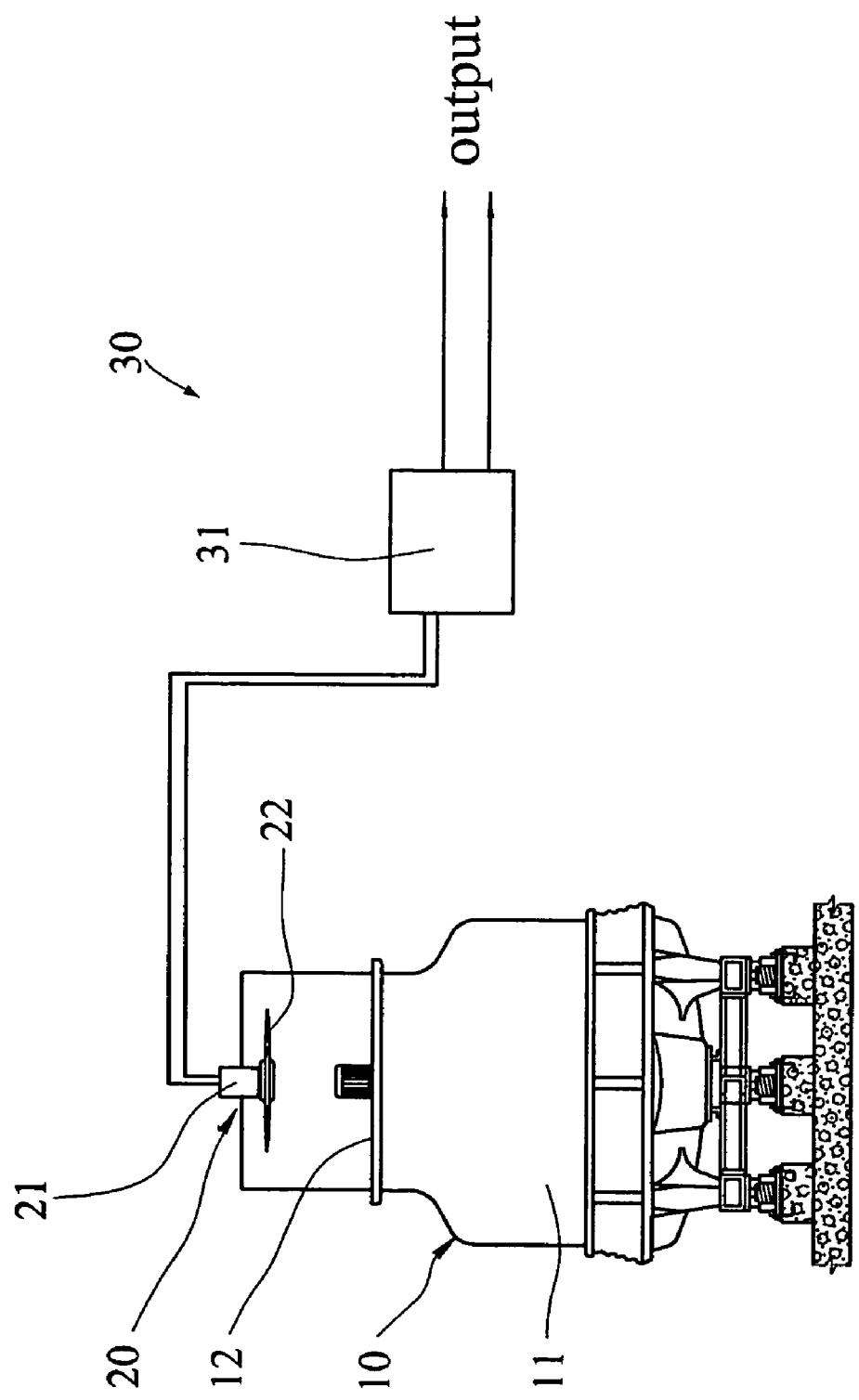
FIG. 2 is a schematic view of a first preferred embodiment of the invention.

Referring to FIGS. 1 and 2 for the method and appratus of generating electricity by reused waste wind of a heat dissipating or ventilation machine of an air conditioning equipment, the structure comprises a motive power end 10, a passive select device 20, and an electric power converter 30.

The motive power end 10 is an air conditioner 11 that produces a waste wind during its operation; a ventilation opening 12 is situated at the upper section of the air conditioner to provide an outlet for discharging the waste wind.

The passive select device 20 includes at least one generator 21 that uses the wind energy for its transmission and is installed at a predetermined position of the upper section of the motive power end 10, and a fan 22 is installed at the ventilation opening 12 for receiving the transmission of the waste wind energy, such that when the passive select device 20 starts operating, the mechanical energy is converted into an electric energy.

The electric power converter 30 is an electric power modulator 31 that receives the current from the passive select device 20 and modulates and switches the AC and DC for outputting electric power.

With the foregoing components, the invention is implemented by the following steps:

a. A passive select device 20 is installed at a motive power end 10. A generator 21 is installed at the upper section of an air conditioner 11, and a fan 22 is installed at the position of a ventilation opening 12 of the air conditioner 11;

b. The motive power end 10 produces a waste wind energy. When the air conditioner 11 is operating, the heat exchange set in the air conditioner 11 produce a wind energy, which is discharged from the ventilation opening 12;

c. The waste wind energy is used to drive the passive select driver 20 and convert the wind energy into an electric energy. The generator 21 reuses the wind energy to be converted into mechanical energy, and further into electric energy; and d. The electric power is outputted from the electric power converter 30. The current is sent to an electric power modulator 31, and then the current is modulated and switched into AC or DC for outputting electric power.

With the foregoing components, the waste wind energy of air conditioner 11 is used and converted into reused electric power, so as to save energy and provide a better way of supplying electric power. In addition, the present invention is applicable for various models of heat dissipating or ventilating air conditioners such as general type air conditioners, square water cooling type water towers, erected or aslant water cooling type water towers, which can be used for the air cooling type outdoor air conditioner or air cooling type ice water cooler, etc.

Figure 3:
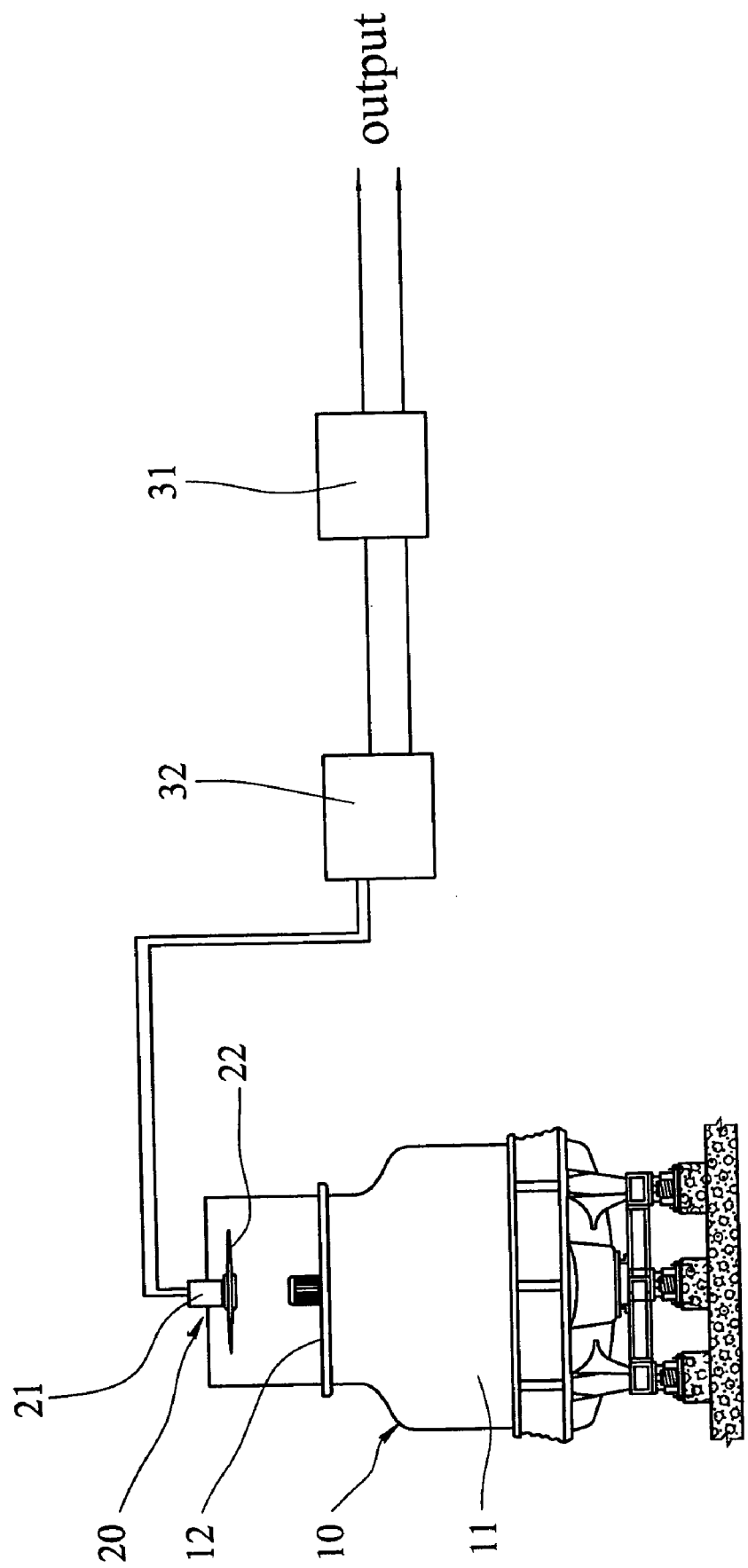
FIG. 3 is a schematic view of a second preferred embodiment of the invention.

Referring to FIG. 3 for the second preferred embodiment of the present invention, the current flow cannot reach a predetermined standard. A ballast 32 is installed for the process of outputting electric power from the electric power converter 30, such that after the generator 21 starts running, the current is outputted to the ballast 32 and then to the electric power modulator 31 for outputting electric power.

Figure 4:
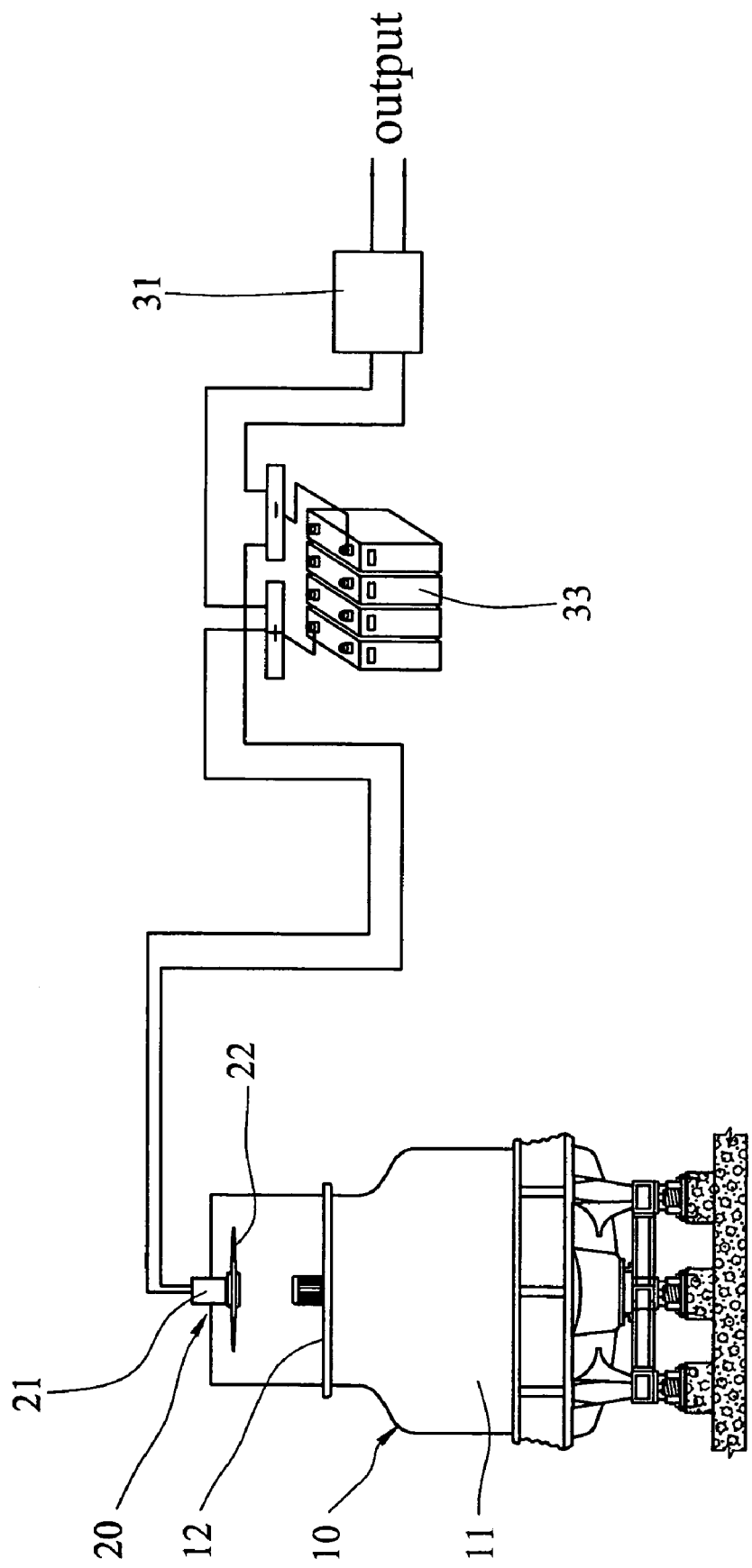
FIG. 4 is a schematic view of a third preferred embodiment of the invention.

Referring to FIG. 4 for the third preferred embodiment of the present invention, a power storage device 33 which is a battery is installed for the process of outputting electric power from the electric power converter 30, such that after the generator 21 starts running, the current is sent to the power storage device 33 for storing the electric power, and then sent to the electric power modulator 31 for outputting electric power. If the electric power is too large or the power supply exceeds its requirement, then a power storage device is provided to achieve the effect of supplying a stable power.

Figure 5:
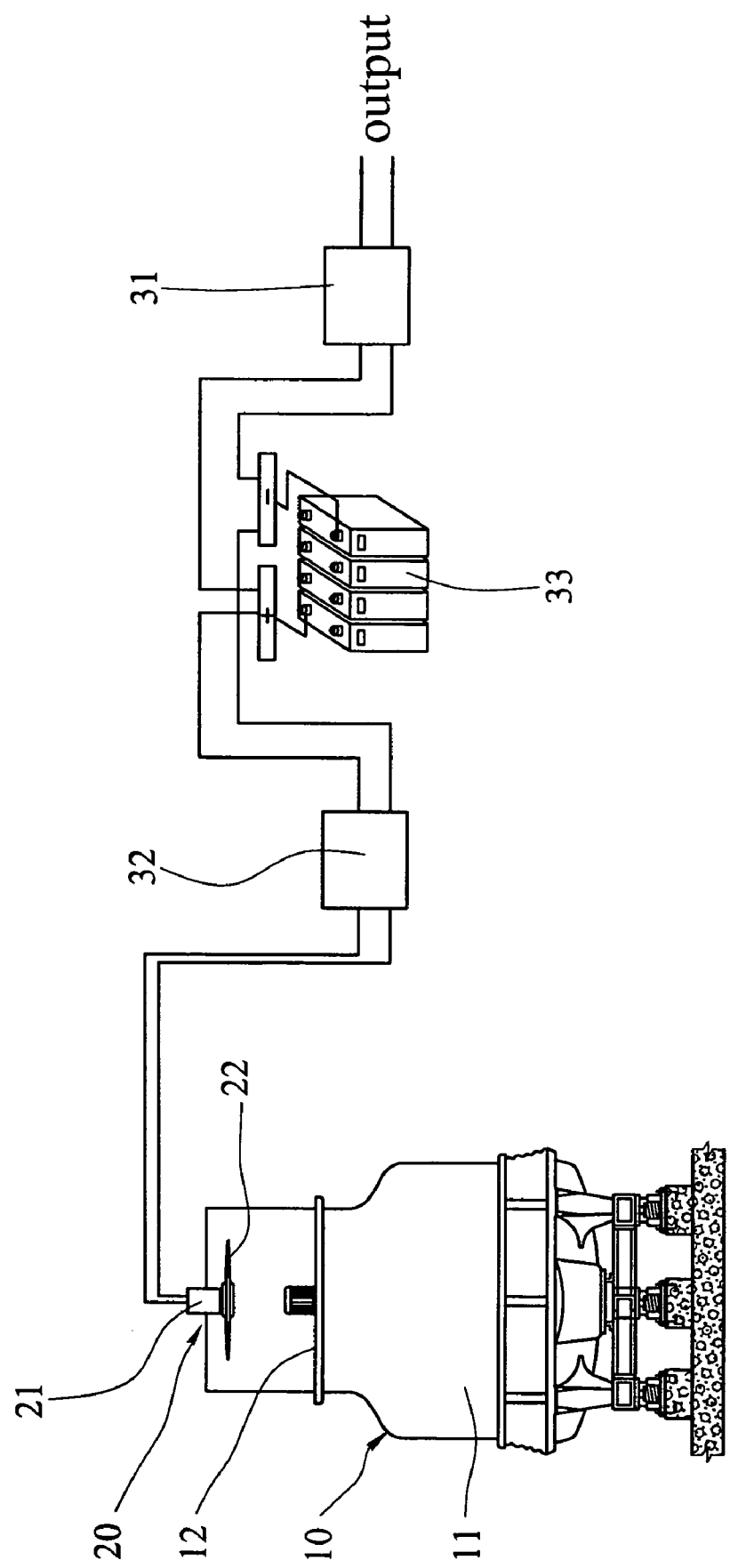
FIG. 5 is a schematic view of a fourth preferred embodiment of the invention.

Referring to FIG. 5 for the fourth preferred embodiment of the present invention, a ballast 32 and a power storage device 33 are installed for the process of outputting electric power from the electric power converter, such that after the generator 21 starts running, the current is sent to the ballast 32 first and then stored into the power storage device 33 and finally sent to the electric power modulator 32 for outputting electric power.

Figure 6:
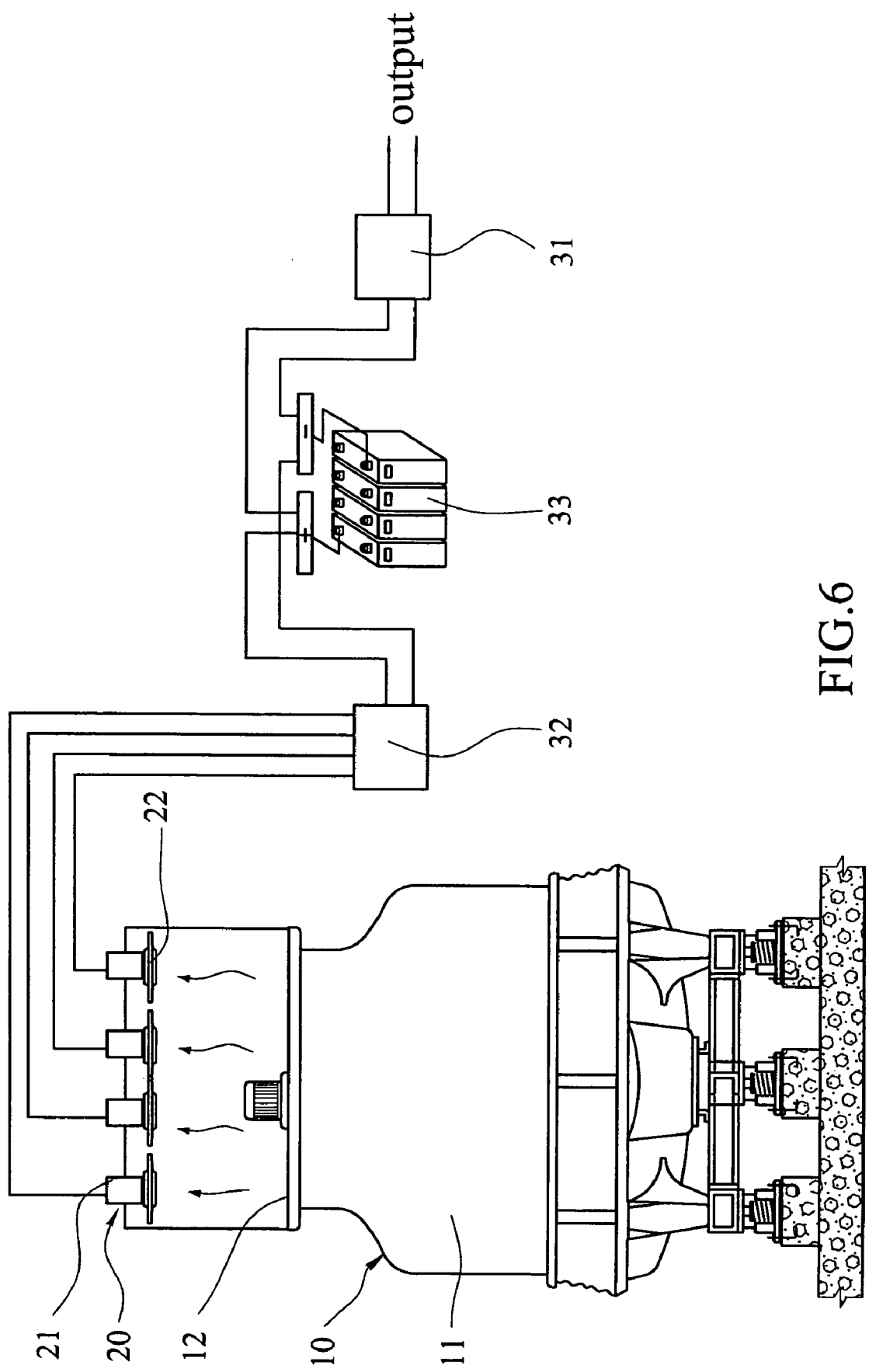
FIG. 6 is a schematic view of a fifth preferred embodiment of the invention.

Referring to FIG. 6 for the fifth preferred embodiment of the present invention, several generators 21 connected in parallel are installed onto several sets of air conditioners 11 for the step of installing a passive select driver 20 at a motive power end 10, so as to maximize the effect of generating electric power and achieve the effect of saving energy. The invention can supply a larger power, and thus has a high compatibility and utility.

Figure 7:
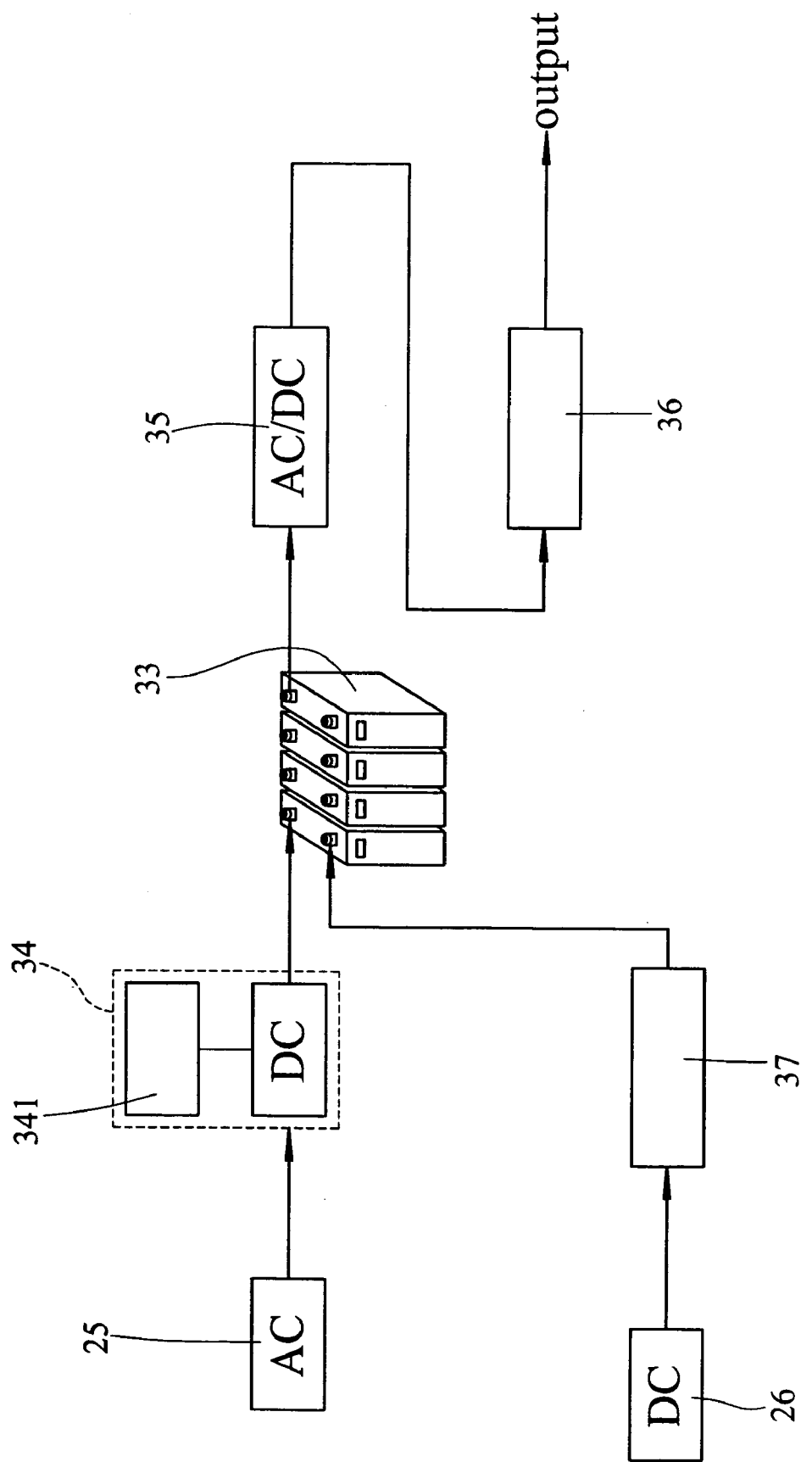
FIG. 7 is a schematic view of a sixth preferred embodiment of the invention.

Referring to FIG. 7 for the sixth preferred embodiment of the present invention, an alternate current converter 34, a power storage device 33 and a direct current converter 35 are installed for the process of outputting electric power from the electric power converter 30 if the passive select driver 20 is used as an alternate current generator 25. After the alternate current generator 25 starts generating power, the current is passed through the alternate current converter 34, the power storage device 33 and the direct current converter 35, and finally to an electric distribution box 36 for outputting electric power. The alternate current converter 34 may have a direct current charger 341 for disconnecting a saturated current or preventing backflows.

A direct current charger 37, a power storage device 33, and a direct current converter 35 are installed for the process of outputting electric power from the electric power converter 30, if the passive select device 20 is used as a direct current generator 26. After the direct current generator 26 starts running, the current is passed through an alternate current converter 37, a power storage device 33 and a direct current converter 35 and finally to an electric distribution box 36 for outputting electric power.

Figure 8:
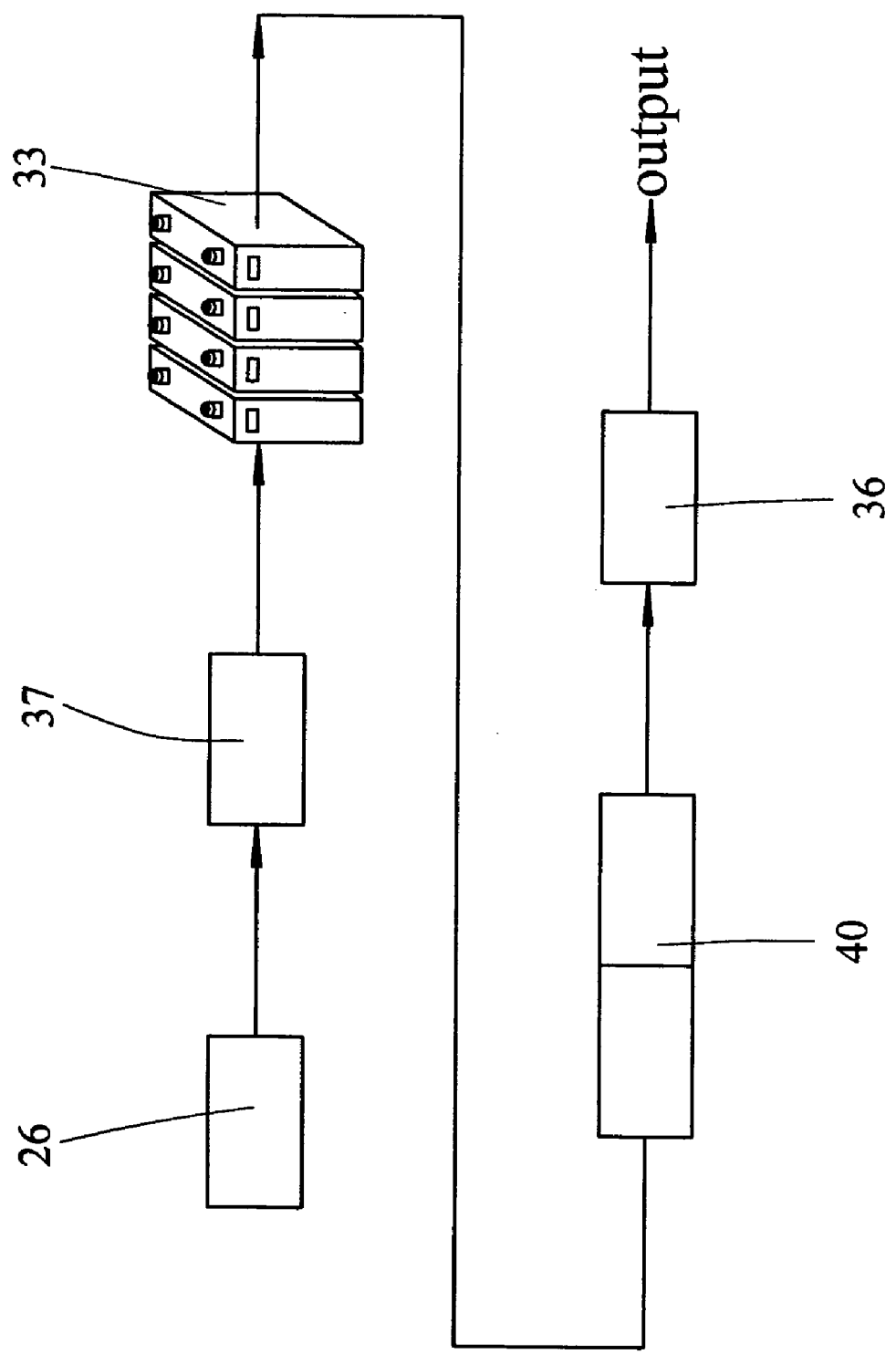
FIG. 8 is a schematic view of a seventh preferred embodiment of the invention.

Referring to FIG. 8 for the seventh preferred embodiment of the present invention, a primary loading end comprises a direct current generator 26 compulsorily driven by the air conditioner or ventilation equipment for generating electricity in the process of outputting electric power from the electric power converter 30. The current is sent directly to a direct current charger 37. A power storage device 32 is provided for sending electricity to a secondary loading end, and the secondary loading end comprises a synchronous generator 40 pivotally connected to a direct current motor and an alternate generator, such that the synchronous generator 40 sends the electric power to an electric distribution box (preferably having a synchronous operation after the direct current motor and an alternate generator are pivotally connected) and finally to an electric distribution box 36 for outputting electric power (110/220 volt), and the connected devices are similar to a circuit amplifier. The input power/ output power ratio is maintained at a value larger than 1 all the time, so as to provide the best way of generating electricity from a recycled energy and meeting the environmental protection requirements.

Figure 9:
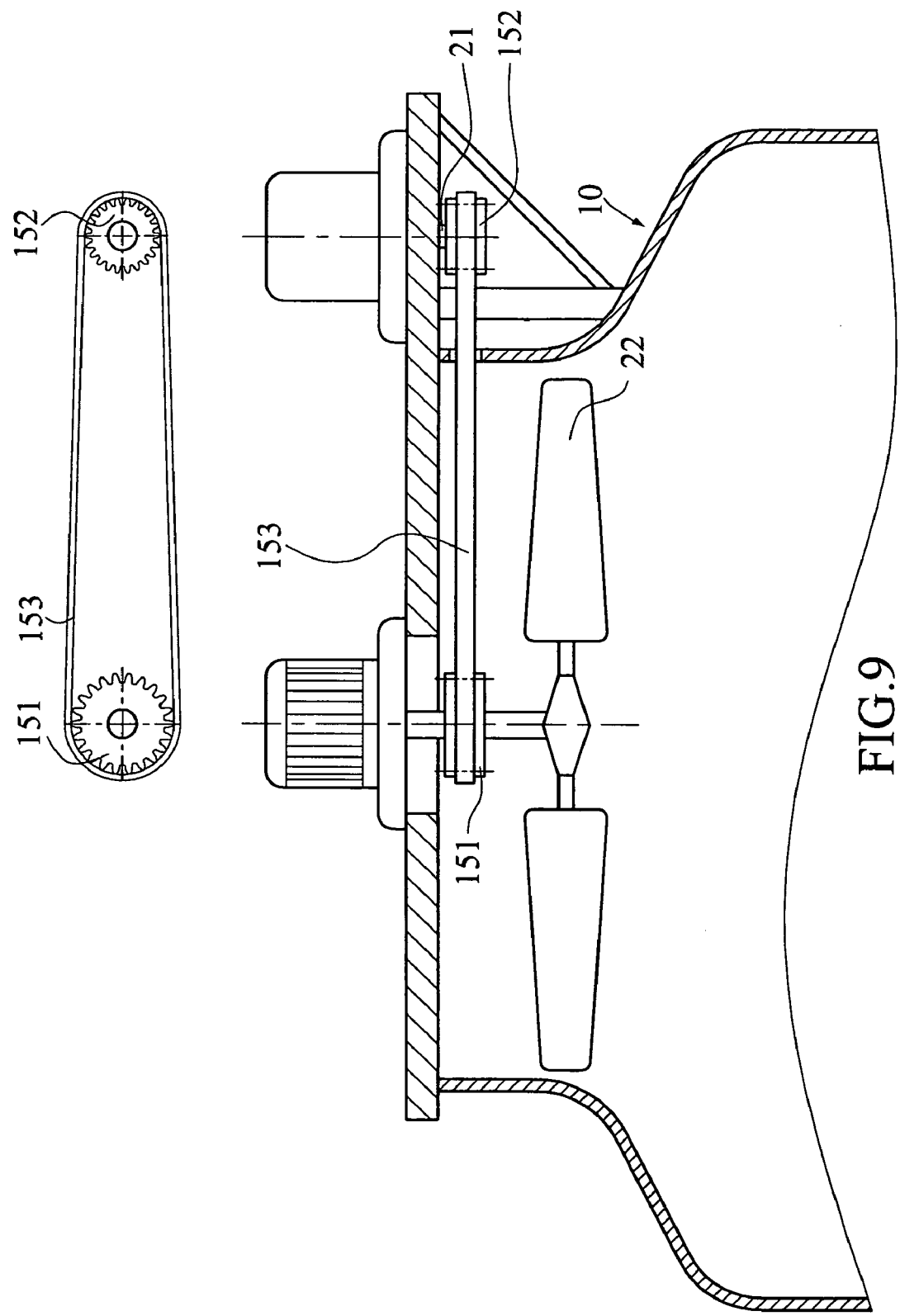
FIG. 9 is a schematic view of transmitting a power accessory device by a chain according to an eighth preferred embodiment of the invention.
Figure 10:
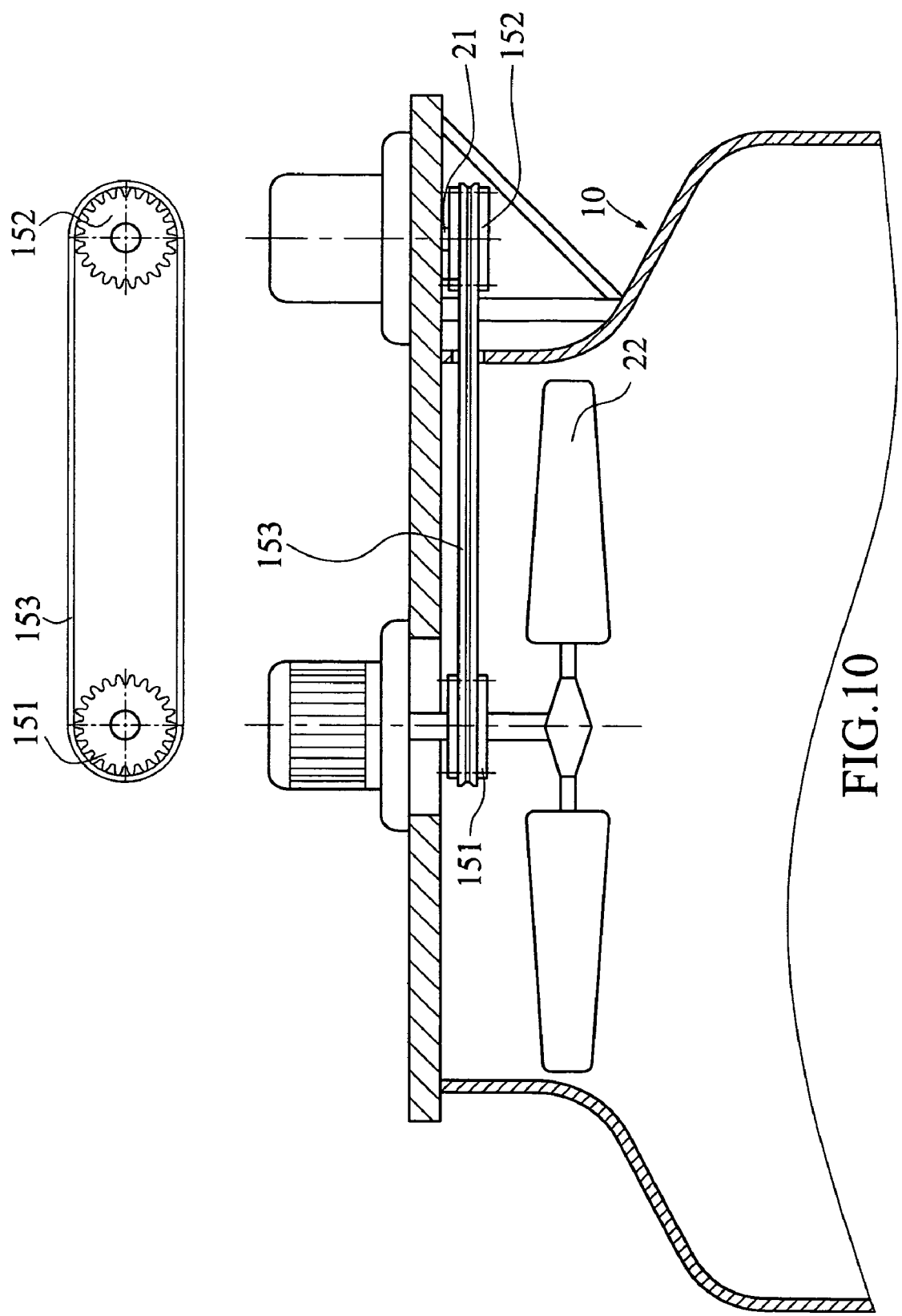
FIG. 10 is another schematic view of transmitting a power accessory device by a chain according to an eighth preferred embodiment of the invention.
Figure 11:
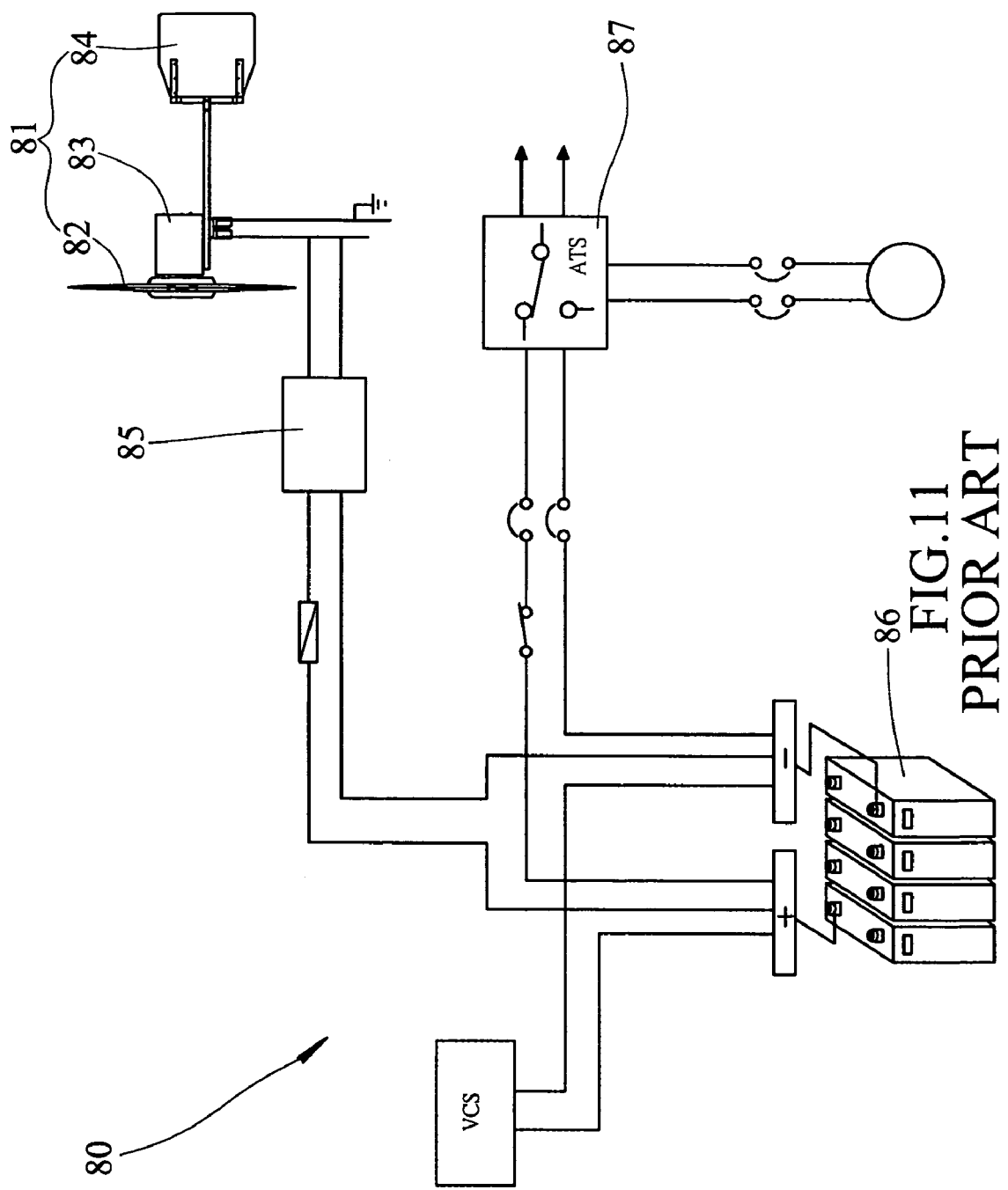
FIG. 11 is a schematic view of a prior art.
Figure 12:
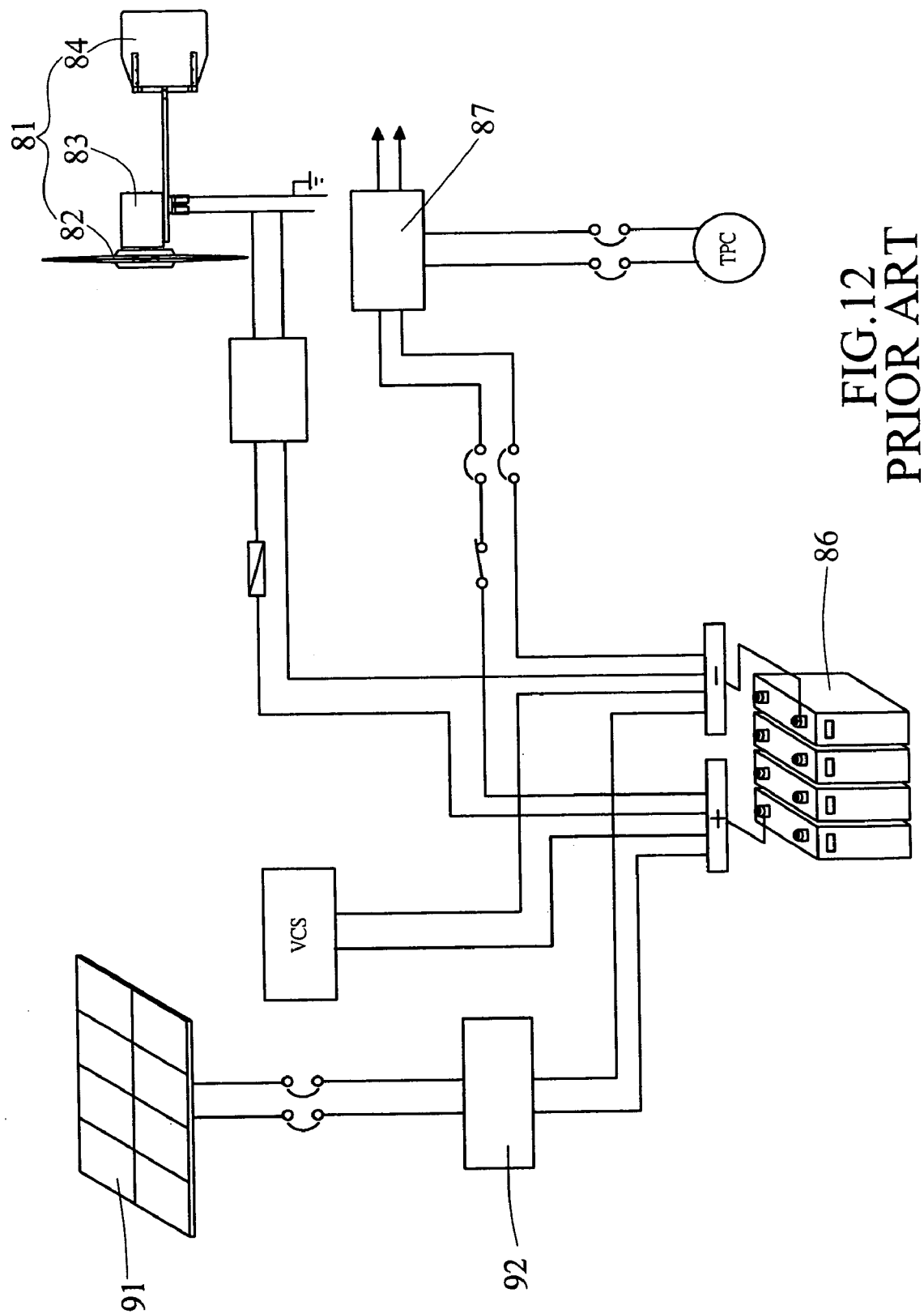
FIG. 12 is another schematic view of a prior art.

Referring to FIGS. 9 and 10 for the eighth preferred embodiment of the present invention, the motive power end 10 further comprises: a motive power accessory device 15 installed at the position of the ventilation opening 12; a first gear set 151 coupled with an axle of the fan 22 and synchronously rotated with the fan 22; a second gear set 152 installed at the axle of the generator 21 rotated synchronously by the transmission of the first gear set 151 and simultaneously driving the generator 21, and each pair of the first and second gear sets 151, 152 comes with a predetermined gear ratio, and a transmitting member 153 is used for the transmission, and the transmitting member 153 could be a belt or a chain.

When the air conditioner 11 is running and discharging the wind to rotate the fan 22, the first and second gear sets 151, 152 are rotated synchronously to drive the generator 21 to rotate and convert the wind energy into electric energy. Therefore, the waste wind energy produced by the air conditioner 11 can be recycled and converted into electric power. In addition, the motive power accessory device 15 has an accessory effect to go with different ratios of large and smaller gear sets, and thus achieving the effect of increasing the rotary speed and maximizing the electric power gain. The motive power accessory device 15 also can use two idler gear sets for the transmissions.

In summation of the description above, the method and apparatus of generating electric power by recycling waste energy of wind produced by a heat dissipating ventilation machine of an air conditioning equipment in accordance with the present invention includes the following features and functions for its structure and applications:

1. Since the invention uses the function of discharging wind of the air conditioner and the wind energy originally discharged and lost in the nature is recycled and reused to produce electric energy, therefore the invention fully uses its energy source to achieve the benefits of environmental protection, save the use of electric power, and lower the cost of electricity.

2. Since the air conditioner 21 of the motive power end 10 has the feature of steadily discharging wind, it can effectively solve the problem of having insufficient wind and obtain a stable power supply. The invention can be used for buildings or factories whose electric equipments, devices, and appliances require uninterrupted power supply systems. The invention is very useful.

3. A factory or a building has a plurality of motive power ends 10 and a plurality of passive select devices 20, so that these components can be connected in parallel by a module design for converting the wind into electric power. The invention can supply and save electric power.

4. The invention is applicable for various different models of air conditioners having a wind discharging function, and thus has a high compatibility and utility.

5. A ballast 31 or a power storage device 32 can be added according to the requirements and the quantity of electric power. The invention is useful for industrial applications.

6. The passive select driver 20 can be installed directly to the motive power end 10, and thus occupying less space. The invention can solve the problem of the prior art wind power generator and its components occupying too much space.

7. The primary loading end is used for generating electric power for the output and storage, and the secondary loading end is used as an alternate current output. The invention provides the best method for recycling the waste energy economically.

8. The invention adds the motive power accessory device 15 to effectively solve the problem of having insufficient wind, and thus maintaining a stable electric power supply and achieving an electric power gain.

While we have shown and described the embodiment in accordance with the present invention, it should be clear to those skilled in the art that further embodiments may be made without departing from the scope of the present invention.

What is claimed is:

1. An apparatus of generating electric power by recycling waste wind energy produced by a heat dissipating ventilation machine of an air conditioning equipment, comprising:
a motive power end, being an air conditioner and producing a waste wind energy during its operation;
a passive select driver, having at least one generator that adopts wind energy for its transmission, and installed at a predetermined upper section of the motive power end for receiving the transmission of the waste wind energy, so that when the passive select driver starts operating, the mechanical energy is converted into electric energy, and a controller coupled to the each generator is provided for receiving a current from each generator in parallel; and
an electric power converter, being a power modulator coupled to the controller for receiving the current passed from the passive select driver and converting and modulating AC and DC for outputting electric power with a predetermined voltage;
thereby the waste wind energy of each air conditioner is recycled and converted into a reused electric energy, so as to save energy and provide a better effect of supplying electric energy.

2. The apparatus of generating electric power by recycling waste wind energy produced by a heat dissipating ventilation machine of an air conditioning equipment of claim 1, wherein the each generator and electric modulator further comprise a ballast for supplying a regulated stable current.

3. The apparatus of generating electric power by recycling waste wind energy produced by a heat dissipating ventilation machine of an air conditioning equipment of claim 1, wherein the each generator and electric modulator further comprise a power storage device for storing electric power.

4. The apparatus of generating electric power by recycling waste wind energy produced by a heat dissipating ventilation machine of an air conditioning equipment of claim 1, wherein the each generator and electric modulator further comprise a ballast and a power storage device connected in series, such that the power storage device stores the power regulated by the ballast.

5. The apparatus of generating electric power by recycling waste wind energy produced by a heat dissipating ventilation machine of an air conditioning equipment of claim 1, wherein the passive select device is an alternate current generator for the step of supplying electric power from the electric power converter, and the each generator and the power modulator further comprise a direct current charger, a power storage device and a direct current, such that after the direct current generator is operated to generate electricity, the current is passed from the direct current charger, the power storage device and the direct current converter to an electric distribution box for outputting an electric power with a predetermined voltage.

6. The apparatus of generating electric power by recycling waste wind energy produced by a heat dissipating ventilation machine of an air conditioning equipment of claim 1, wherein the passive select driver is an alternate current generator for the step of supplying electric power from the electric power converter, and the each electric generator and electric modulator further comprise a stable current voltage regulator, such that after the alternate current generator is operated to generate electric power, the current is sent to a stable current voltage regulator and finally sent to an electric distribution box for outputting electric power.

7. The apparatus of generating electric power by recycling waste wind energy produced by a heat dissipating ventilation machine of an air conditioning equipment of claim 1, wherein the passive select driver is an alternate current generator for the step of supplying electric power from the electric power converter, and the each generator and power modulator further comprise an alternate current converter, a power storage device and a direct current converter connected in series, such that after the direct current generator is operated to generate electricity, the current is passed from the alternate current converter, the power storage device and the direct current converter to an electric distribution box for supplying electric power.

8. The apparatus of generating electric power by recycling waste wind energy produced by a heat dissipating ventilation machine of an air conditioning equipment of claim 1, wherein the passive select drivers are connected in parallel and installed onto the plurality of motive power ends.

9. The apparatus of generating electric power by recycling waste wind energy produced by a heat dissipating ventilation machine of an air conditioning equipment of claim 1, wherein the motive power end further comprises a motive power accessory device installed at the ventilation opening.

10. The apparatus of generating electric power by recycling waste wind energy produced by a heat dissipating ventilation machine of an air conditioning equipment of claim 9, wherein the motive power accessory device comprises a first gear set pivotally coupled to the fan and synchronously rotated with the fan; a second gear set installed at an axle of the generator and synchronously rotated by the transmission of the first gear set for simultaneously driving the generator.

11. The apparatus of generating electric power by recycling waste wind energy produced by a heat dissipating ventilation machine of an air conditioning equipment of claim 9, wherein the motive power accessory device is a first idler gear set coupled to an axle of the fan and synchronously rotated by the transmission of the idler gear set for simultaneously driving the generator.

12. A method of generating electric power by recycling waste wind energy produced by a heat dissipating ventilation machine of an air conditioning equipment of claim 1, comprising the steps of:
(a) installing a passive select driver at a motive power end, such that at least one generator is installed at the upper section of an air conditioner, and a fan is installed at a ventilation opening of the air conditioner;
(b) the motive power end producing a waste wind energy, such that when the air conditioner is running, a heat exchanger produces wind energy discharged from the ventilation opening;
(c) using the waste wind energy to drive the passive select driver and convert the wind energy into electric energy, and the generator reuses the wind energy and also converts the wind energy into a mechanical energy which is converted further into an electric energy; and
(d) the electric power converter outputting a power, and the current is outputted to an electric power modulator, such that the current is modulated and switched into AC or DC for outputting an electric power with a predetermined voltage.

13. The method of generating electric power by recycling waste wind energy produced by a heat dissipating ventilation machine of an air conditioning equipment of claim 1, comprising the steps of:
installing a primary loading end, comprising a direct current generator for generating electricity by a heat dissipating device of a ventilation end of an air conditioner or a ventilation equipment;
installing a direct current charger coupled to the direct current generator and driven for generating electricity, and further including a power storage device and supplying electric power to a secondary loading end; and
installing a secondary loading end, comprising a direct current motor and an alternate current generator pivotally coupled to form a synchronous generator, such that the synchronous generator is driven by the power storage device to output a voltage current;
thereby the primary loading end is driven by the wind energy, and an intermediary power storage device drives the synchronous generator pivotally coupled to an alternate current/direct current generator, and coupled to an electric distribution box for outputting electric power.

* * * * *